(12) United States Patent
Serizawa (10) Patent No.: US 7,409,507 B2
(45) Date of Patent: Aug. 5, 2008

(54) DIFFERENCE BIT MAP MANAGEMENT METHOD, STORAGE APPARATUS, AND INFORMATION PROCESSING SYSTEM

(75) Inventor: Kazuyoshi Serizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 11/197,194

(22) Filed: Aug. 3, 2005

(65) Prior Publication Data

US 2006/0271750 A1 Nov. 30, 2006

(30) Foreign Application Priority Data

May 26, 2005 (JP) .............................. 2005-154126

(51) Int. Cl.
*G06F 13/10* (2006.01)
*G06F 13/38* (2006.01)
(52) U.S. Cl. ...................................... 711/154; 711/162
(58) Field of Classification Search .................. 711/154, 711/162
See application file for complete search history.

(56) References Cited

U.S. PATENT DOCUMENTS 6,618,794 B1 9/2003 Sicola et al.
2005/0204105 A1* 9/2005 Kawamura et al. .......... 711/162

* cited by examiner

*Primary Examiner*—H. S. Sough
*Assistant Examiner*—Shawn Eland
(74) *Attorney, Agent, or Firm*—Townsend and Townsend and Crew LLP (57) ABSTRACT

Disclosed is to reduce an amount of memory required for a difference bit map corresponding to a storage extent of large capacity. A difference bit map 27 is made into multi-tiers. A difference is expressed by a bit 321 of an entry 320 of a second tier. An entry 310 of a first tier is provided with a pointer 311 to the entry of the second tier and a representative bit 313, and the entry 320 of the second tier is made unnecessary when all values of the corresponding bits 321 are equal to a value of the representative bit 313.

20 Claims, 10 Drawing Sheets

DIFFERENCE BIT MAP MANAGEMENT METHOD, STORAGE APPARATUS, AND INFORMATION PROCESSING SYSTEM

BACKGROUND

The present invention relates to a storage apparatus and a control method thereof, and more particularly relates to a difference bit map management method, storage apparatus, and information processing system for recording a difference between volumes in the storage apparatus.

In the past, as to a method for managing a difference between volumes in a storage apparatus by using a bit map, the storage apparatus has a bit map on an internal memory and, a host processor has specified which one is a block having been written after an acquisition of a snapshot for performing an acquisition of difference data with respect to a certain volume as disclosed in the patent reference 1, for example. Furthermore, each bit in the bit map thereof had a correspondence of 1:1 to the block according to the patent reference 1.

In addition, in a method for managing a cache memory in this storage apparatus by using a directory, a cache directory (a directory to manage the cache memory) had information for controlling an area on the cache memory.

[Patent reference 1] U.S. Pat. No. 6,618,794 Specifications

However, in the bit map management method described in the above-mentioned patent reference 1, it is necessary to prepare a memory area for a bit map to record a difference, which manages renewal with respect to data stored in a logical volume at a certain time point (hereinafter, referred to as "difference bit map") in the storage apparatus to the extent proportional to a size of a volume intended to record the difference. Due to this reason, there has been such an inconvenience that the more the total amount of volumes intended to record the difference increases, the more the memory becomes necessary.

SUMMARY

Accordingly, the present invention aims at reducing a memory size required for a difference bit map.

In order to solve the above-described problem and to achieve the aim of the present invention, a method for managing a difference bit map according to the present invention is the one wherein the difference bit map is expressed by a combination of two-tier tables having an entry of a first tier table and an entry of a second tier table, a presence or absence of a difference shown by the entry of the first tier table is expressed by a value of a first bit stored on the entry of the second tier table, the entry of the first tier table stores first identification information specifying the entry of the second tier table and second identification information indicating an existence or non-existence of the entry of the second tier table, and when all the first bits of the entry of the second tier table are equal to a predetermined value, the non-existence of the entry of the second tier table is recorded in the second identification information that is stored on the corresponding entry of the first tier table.

The present invention is configured by using a storage apparatus which has at least built-in memory and processor.

The difference bit map is configured to have at least the two-tier tables. The presence or absence of the difference is shown by the value of the first bit (for example, 0 (absence of difference) or 1 (presence of difference)). The first bit corresponds to one piece or the predetermined number of blocks on the first volume to which the difference should be recorded. The first bit is stored on the second entry as a bit string.

The first entry of the first tier table has at least a pointer to the second entry and a second bit to show whether this pointer is valid or invalid. The second entry of the second tier table includes at least the predetermined number of strings of the first bit.

The first entry corresponds to a plurality of blocks on the first volume in sequential order of blocks thereof from the top, and the number of blocks thereof is the same as the number of blocks to which one piece of the second entry corresponds. Furthermore, when the second bit shows invalid, it is prescribed beforehand that all of the first bit string which should correspond thereto indicates either 1 or 0, for example, (here, it is assumed to be 0, for example). Then, since it is possible to release all the second entries in which all the first bits are 0, for example, the amount of memory required for the difference bit map can be reduced when there are a lot of 0 on the difference bit map, for example.

Furthermore, a third bit is provided to the first entry in order to store the value of the first bit string which should correspond to the first entry when the second bit is invalid. Thereby, the second entry becomes not necessary for every first entry; more specifically the second entry becomes not necessary in either case that all the first bits for each area of a part of the first volume are 0 or 1, for example. Accordingly, a chance of being able to reduce the amount of memory required for the difference bit map is increased.

As a further effect, when the amount of memory required for the difference bit map becomes insufficient, it is possible to evade a depletion of memory by consecutively marking out (instead of having a useless copy generated) the first bit corresponding to the first entry with the bit indicating the existence of difference (1, for example). More specifically, when an allocation of the second entry becomes not possible, another suitable second entry is searched, a corresponding third bit is set into 1 and a corresponding second bit is set into invalid, and the second entry whose release becomes possible is newly used.

Furthermore, the difference bit map is stored on the cache directory. Thereby, since a part of directory retrieval can be performed at the time of referring to the difference bit map, it is possible to reduce memory access, which contributes to an improvement of performance.

According to the present invention, when bits of the same value continue on the difference bit map, it becomes possible to reduce a memory capacity required for the difference bit map since a memory area allocated to these bits is reduced.

Moreover, since both the reference to the difference bit map and a part of directory retrieval can be performed at the same time by storing the difference bit map on the cache directory, it is possible to reduce the memory access and to improve the performance.

DESCRIPTION OF THE PREFERRED EMBODIMENTS

Hereinafter, embodiments of the present invention are explained by using accompanied drawings, but it is needless to say that the present invention is not limited to the embodiments explained hereinafter.

First, a first embodiment of an information processing system to which the present invention is applied is explained by using FIG. 1 through FIG. 4.

Figure 1:
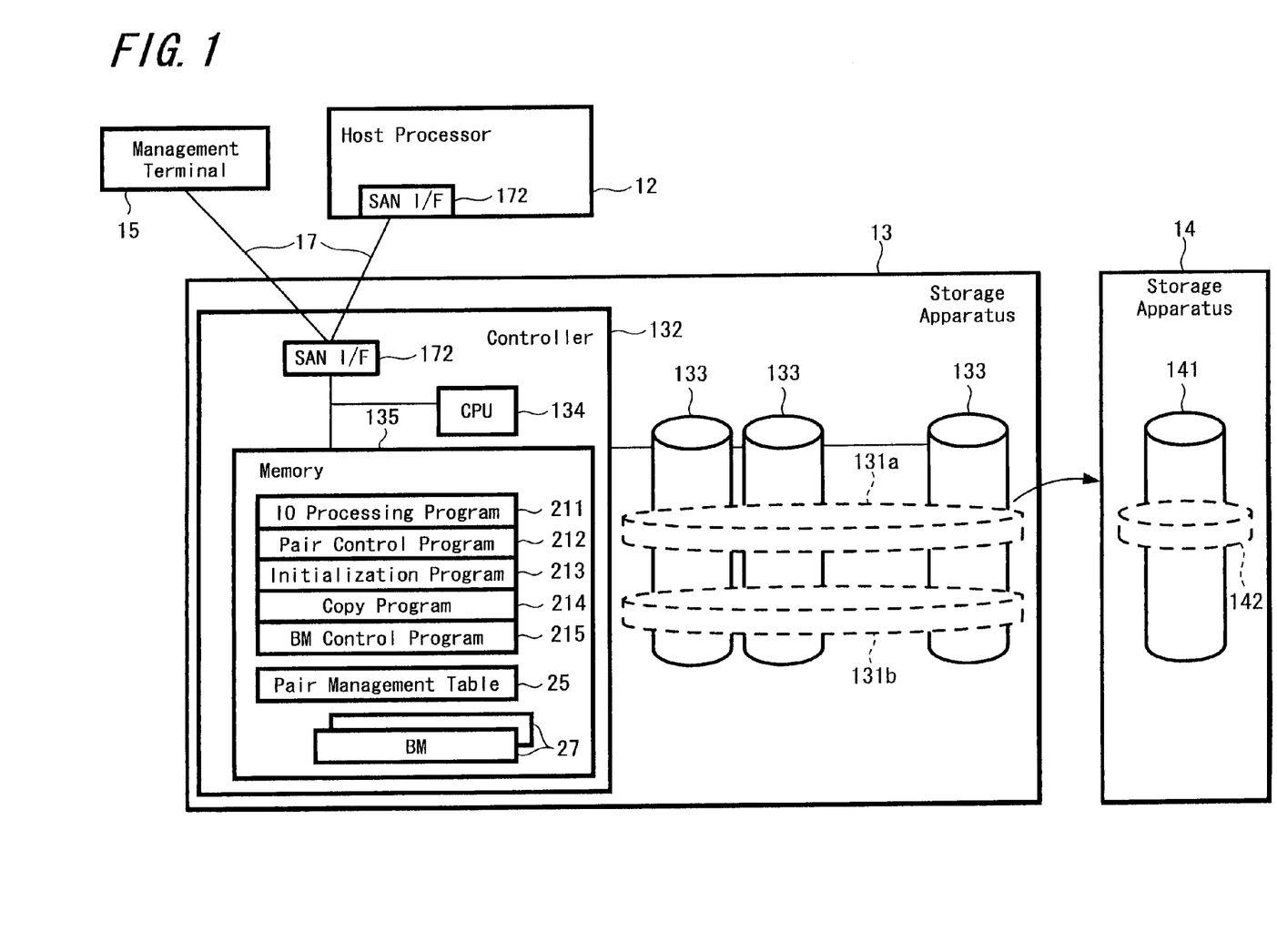
FIG. 1 is a diagram showing a general configuration of a storage apparatus according to the present invention.

FIG. 1 is a diagram showing a general configuration of a storage apparatus of the first embodiment. This system is provided with at least one set of host processor 12, at least one set of storage apparatus 13, and a SAN (Storage Area Network) link 17.

The host processor 12 is a computer that uses data stored on the storage apparatus 13. The host processor 12 has a built-in SAN interface (SAN I/F) 172. The SAN I/F 172 is an adaptor for the host processor 12 to input and output data to/from the storage apparatus 13 through the SAN link 17 and more specifically, is a host bus adaptor (HBA) of Fibre Channel (FC). However, another protocol such as SCSI, iSCSI, and InfiniBand may be used for connection between the host processor 12 and the storage apparatus 13, and the SAN I/F 172 only needs to be an adaptor corresponding to each protocol. In addition, the SAN link 17 is not necessarily a single link, but may be a SAN through an FC switch.

The storage apparatus 13 is a storage sub-system having a controller 132 and a disk device 133 such as a hard disk drive. In addition, the storage apparatus 13 has at least one logical volume 131. The logical volume 131 is a logical storage extent comprised of a physical storage extent that is possessed by the storage apparatus 13. The logical volume 131 is recognized as one logically independent storage apparatus by a device such as the host processor 12 which performs an input and output to the storage apparatus 13.

The controller 132 has a CPU 134, a memory 135 and a SAN I/F 172 which are built therein. The memory 135 stores an IO processing program 211, a pair control program 212, an initialization program 213, a copy program 214, and a difference bit map (BM) control program 215, which are processed by the CPU 134 respectively. Furthermore, the memory 135 contains a pair management table 25 and at least one piece of difference bit map (BM) 27. The difference bit map 27 is a bit map to record a difference of the logical volume 131, more specifically a position of a block (group) in which the host processor 12 has performed writing since a certain point of time, and is provided for each volume that is intended to record the difference. A configuration of the difference bit map 27 is explained later in details.

The difference bit map control program 215 is a program to check, or to set, or to clear a value of a bit on the difference bit map 27 corresponding to an address on the logical volume 131. The difference bit map control program 215 is explained later in details.

Here, the storage apparatus 13 of the first embodiment has a logical volume 131a and a logical volume 131b. The pair control program 212 is a program to define the logical volume 131a and logical volume 131b as a pair for making contents thereof matched and to perform an erasion of the definition thereof, separation of the pair, and resynchronization. Contents of these processing, and also contents of processing of the initialization program 213 and copy program 214 are explained later together with an explanation of the pair management table 25.

The IO processing program 211 is a program to process a request for reading and writing which is issued by the host processor 12. The processing of the IO processing program 211 is explained later by using FIG. 9.

The SAN I/F 172 is an adaptor for the host processor 12 to input and output data through the SAN link 17.

In addition, this system is provided with a management terminal 15 besides the configuration described hereinbefore, and is configured such that the management terminal 15 can request a pair definition, erasion of pair definition, pair separation, and pair resynchronization to the storage apparatus 13 through the SAN link 17. It should be noted that the connection between the management terminal 15 and the storage apparatus 13 may be another method such as a LAN (Local Area Network) or serial cable as long as the mutual communication is made possible. Furthermore, it is also possible that the management terminal 15 is made to be the same computer as the host processor 12 and the host processor 12 realizes functions of the management terminal 15 by software stored in the inside thereof.

Moreover, this system is provided with another storage apparatus 14 besides the above-described configuration, and is configured such that a remote copy from the logical volume 131 provided to the disk device 133 of the storage apparatus 13 to a logical volume 142 provided to a disk device 141 of the other storage apparatus 14, which are made into a pairing state, can be performed through a network which is not illustrated.

Figure 2:
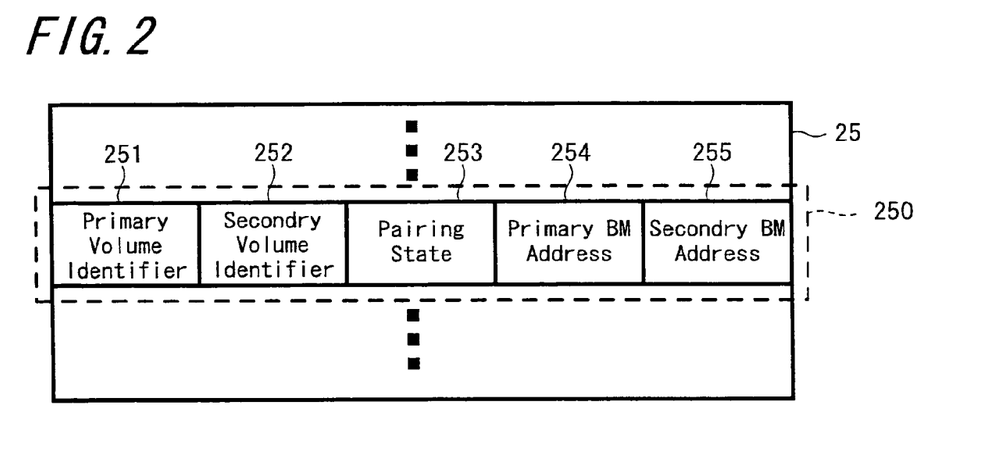
FIG. 2 is a configuration diagram showing contents of a pair management table.

FIG. 2 is a configuration diagram showing contents of the pair management table 25 that is provided in the storage apparatus 13 in the first embodiment.

The pair management table 25 is configured to have a plurality of entries 250, and each entry 250 corresponds to one pair of pairing of the logical volumes 131. The entry 250 contains a primary volume identifier 251, a secondary volume identifier 252, a pairing state 253, a primary BM address 254, and a secondary BM address 255. The primary volume identifier 251 and secondary volume identifier 252 are identifiers to specify the logical volume 131, and the primary volume identifier 251 corresponds to the logical volume 131a that is the primary side of the pair and the secondary volume identifier 252 corresponds to the logical volume 131b that is the secondary side of the pair. The contents of processing of the CPU 134 to the primary and secondary logical volumes 131 vary depending on the pairing state 253 shown later. Both of the primary BM address 254 and the secondary BM address 255 are addresses to designate the difference bit map 27.

The pairing state 253 shows at least either one of two kinds of state of the synchronization and separation. A case where the pairing state 253 is the synchronization means that writing into the logical volume 131a of the primary side from the host processor 12 is also reflected to the logical volume 131b. Also, a case where the pairing state 253 is the separation means that the writing into the logical volume 131a of the primary side from the host processor 12 is regarded as the difference to the logical volume 131b and a position of an updated block (group) is stored on the difference bit map 27 that is designated by the primary BM address 254. Writing into the logical volume 131b from the host processor 12 is similarly stored on the difference bit map 27 that is designated by the secondary BM address 255. It should be noted that the CPU 134 actually executes the difference bit map control program 215 to perform the update of the difference bit map 27.

Figure 3:
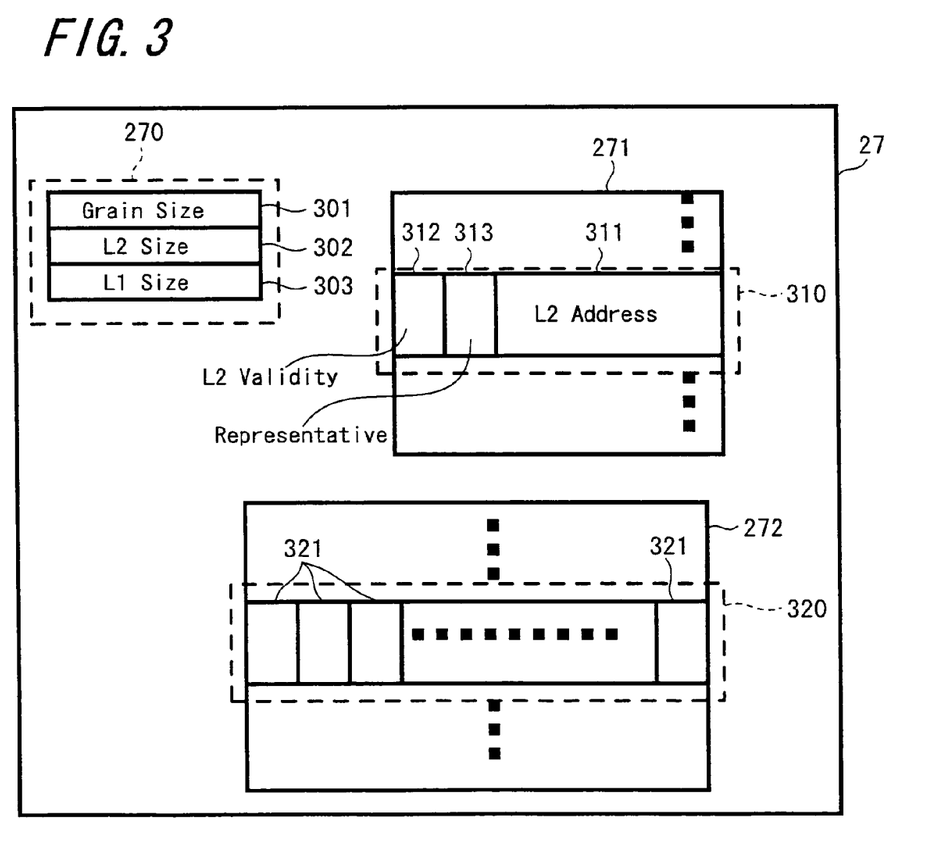
FIG. 3 is a configuration diagram showing contents of a difference bit map.

FIG. 3 is a configuration diagram showing contents of the difference bit map 27 that is provided in the storage apparatus 13 in the first embodiment.

The difference bit map 27 contains control information 270, an L1 table 271, and an L2 table 272. A grain size 301, an L2 size 302, and an L1 size 303 are contained in the control information 270.

The L2 table 272 is configured to have a plurality of L2 entries 320. The L2 entry 320 is configured to have bits 321 in the number shown by the L2 size 302. One bit of the bits 321 corresponds to blocks on the logical volume 131 in the number shown by the grain size 301. The number of blocks on the logical volume 131 corresponding to one L2 entry 320 is the number in which a value of the L2 size 302 is multiplied to a value of the grain size 301.

The L1 table 271 is configured to have L1 entries 310 in the number shown by the L1 size 303. The L1 entry 310 corresponds to the block (group) of the logical volume 131 in the right order inside the L1 table 271. It should be noted that the number of blocks on the logical volume 131 corresponding to one L1 entry 310 is the same number as the number of blocks corresponding to one L2 entry 320.

The L1 entry 310 contains an address 311 of a corresponding L2 entry, an L2 validity bit 312 showing whether the address 311 is valid or invalid, and a representative bit 313.

When all values of the bits 321 are same as a value of the representative bit 313, the L2 validity bit 312 is cleared into invalid (0) and the L2 entry designated by the L2 address can be released. Conversely, when the L2 validity bit 312 is made into invalid, the values of the corresponding bits 321 are regarded the same as the value of the representative bit 313.

Thus, when all the bits 321 corresponding to the L2 entry 320 are the same value, it is possible to reduce the memory capacity by making the difference bit map 27 into the two tiers of the L1 entry 310 and L2 entry 320. In addition, it is possible to avoid the allocation of the L2 entry 320 by having the representative bit 313 in the L1 entry 310 even when a string of 0 and string of 1 mixedly exist as a consecutive bit string in the difference bit map, and a chance of being able to reduce the memory capacity is increased.

Next, processing of the CPU 134 at the time of operating the bit map 27 that is provided in the storage apparatus 13 is explained by using FIG. 4 through FIG. 7.

Figure 4:
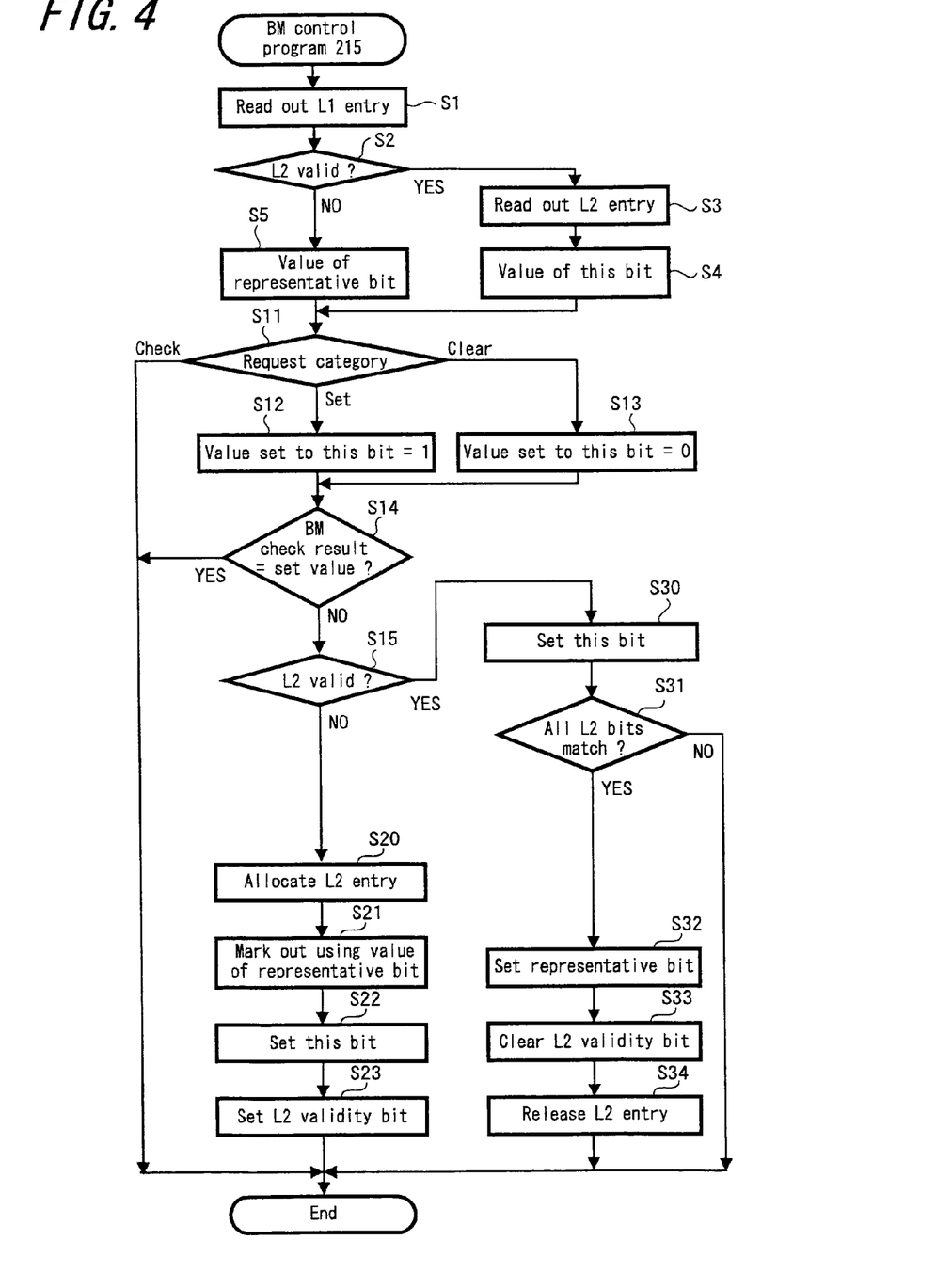
FIG. 4 is a flow chart showing processing of a difference bit map control program.

FIG. 4 is a flow chart showing processing of the difference bit map control program 215 that is provided in the storage apparatus 13 in the first embodiment.

In the difference bit map control program 215, the CPU 134 checks a value of a bit corresponding to a block on the logical volume 131 that is an object of the operation (step S1 through step S5). In each step, the CPU 134 first reads out the L1 entry 310 corresponding to the block on the logical volume 131 that becomes the object of the operation (step S1).

More specifically, a block address on the logical volume 131 that becomes the object of the operation is divided by the number of blocks corresponding to one L1 entry 310, and the L1 entry 310 is specified by referring to the L1 table 271 using a quotient thereof as an index. Next, the CPU 134 checks the L2 validity bit 312 in the L1 entry 310 which is read out in step S1, and if the L2 validity bit 312 is valid (Y branch of judgment step S2), the L2 entry 320 designated by the address 311 of the L2 entry is read out (step S3) and a value of the bit 321 corresponding to the block address on the logical volume 131 that becomes the object of the operation is read out (step S4). On the other hand, if the L2 validity bit 312 is invalid in step S2 (N branch of judgment step S2), the CPU 134 reads out a value of the representative bit 313 (step S5) and the value of either the bit 321 that is read out in step S4 or the representative bit 313 that is read out in step S5 is made into a value of a difference bit.

Furthermore, the CPU 134 diverges according to a request category as to which control the difference bit map control program 215 performs (step S11). If the request category is to check, the CPU 134 does not perform any processing and returns the value of the difference bit checked in steps S1 through S5 to an invoker, and the process is ended.

If the request category is to set or to clear, the CPU 134 sets the value of the bit corresponding to the block. More specifically, the CPU 134 sets 1 (step S12) when the request category is to set, and sets 0 (step S13) when the request category is to clear. Furthermore, the CPU 134 compares the value that is set in step S12 or step S13 with the value of the difference bit that is checked in step S1 through step S5, and if these values are matched (Y branch of judgment step S14), the process is ended without further processing since the case is that the value intended to set is equal to the present value of the bit 321 and there is no specific need to perform the processing.

Since the value of the bit 321 needs to be updated when these values do not match in step S14, the CPU 134 checks the L2 validity bit 312 that is checked in step S2, and if this bit is valid (Y branch of judgment step S15), step S30 through step S34 are executed so that the update of the bit 321 and a release trial of the L2 entry 320 are performed.

More specifically, the CPU 134 sets the value that is set in step S12 or step S13 to the bit 321 that is read out in step S4 (step S30). Furthermore, the CPU 134 checks whether all the bits 321 contained in the L2 entry 320 are matched, and when all the bits are matched (step S31), the CPU 134 sets the corresponding representative bit 313 into the value of the bit 321 (step S32), clears the corresponding L2 validity bit 312 (step S33), and releases the L2 entry 320 (step S34). The L2 validity bit 312 is checked, and if the L2 validity bit is invalid (N branch of judgment step S15), an unused L2 entry 320 is allocated to the L1 entry 310 that is read out in step S1 (step S20).

More precisely, the unused L2 entry is detected from the L2 table 272, and an address thereof is stored on the address 311 of the L2 entry. It should be noted that management of whether the L2 entry 320 is used or unused may be performed by preparing and managing an address list of an available L2 entry queue on the difference bit map 27, or may be performed by an arbitrary method such as managing the available L2 entry by connecting among L2 entries with a pointer and tracing the pointer. Furthermore, the CPU 134 sets the contents of the allocated L2 entry 320. First, the CPU 134 marks out consecutively the L2 entry 320 by using the value of the corresponding representative bit 313 (step S21), and sets the value that is set in step S12 or step S13 to the value of the bit 321 corresponding to the block address on the logical volume 131 that becomes the object of the operation (step S22). Further, the corresponding L2 validity bit 312 is set (step S23).

The CPU 134 can read the value of the difference bit based on the bit 321 of the L2 entry 320 or the representative bit 313 of the L1 entry 310 from the difference bit map 27 by the method shown in step S1 through step S5, and can set the value of the bit 321 to the area where the L2 entry is not allocated by the method shown in step S20 through step S23.

Moreover, the CPU 134 makes it possible to release the L2 entry 320 by the method shown in step S30 through step S34 when a consolidation becomes possible due to the matching of all bits 321 of the L2 entry 320 after setting the bit 321. The CPU 134 can perform normally reading and writing to the difference bit map 27 by using the methods described hereinbefore. In other words, the difference bit map 27 has the configuration of two tiers made of the L1 entry 310 and L2 entry 320, furthermore it is possible to configure such that the L2 entry 320 needs not to be prepared for all logical volumes but a partial preparation thereof can suffice, and thereby it is possible to reduce the memory capacity.

Figure 5:
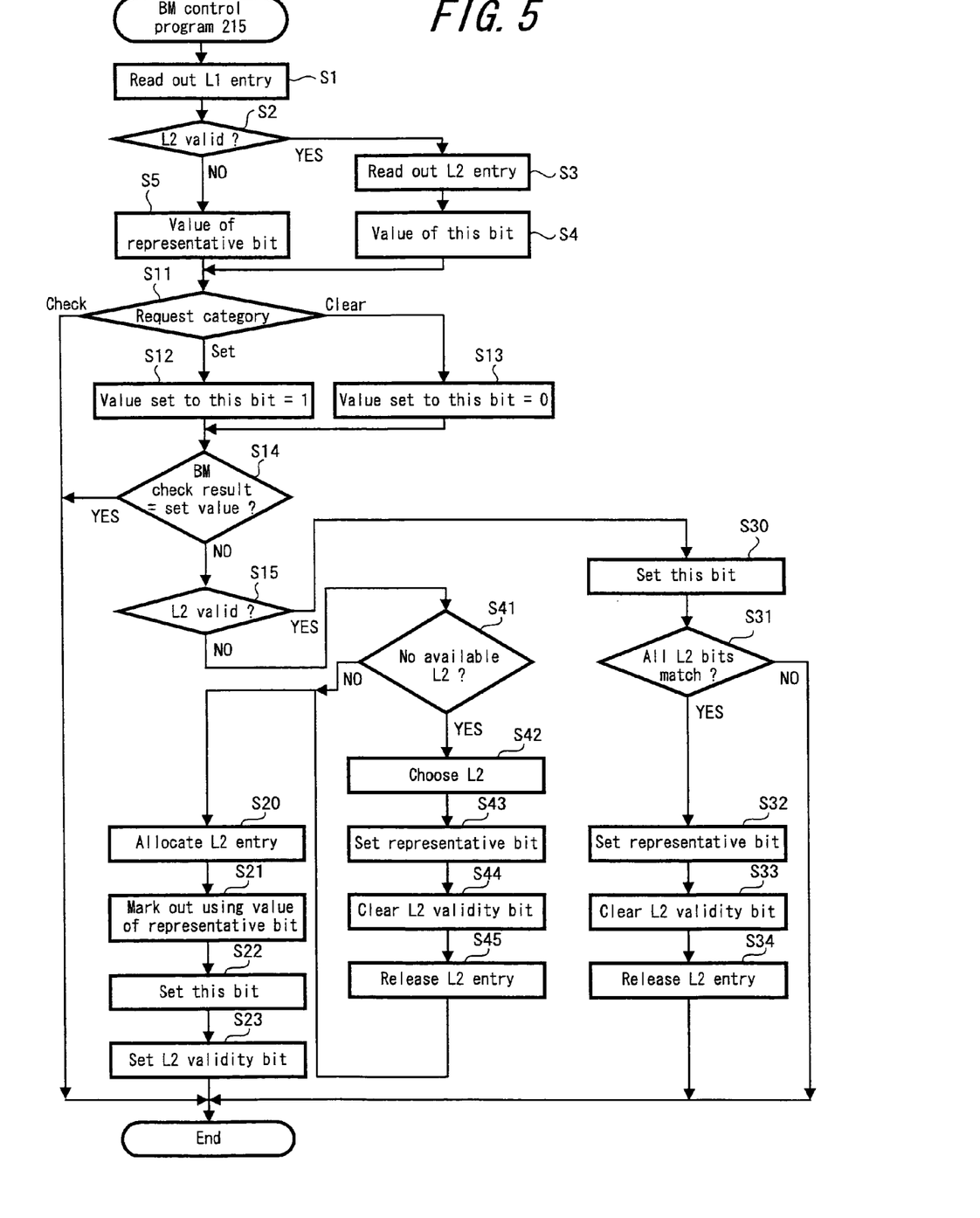
FIG. 5 is a flow chart showing processing of another difference bit map control program.

Next, a second embodiment of the present invention is explained by using FIG. 5.

FIG. 5 is a flow chart showing contents of processing of the difference bit map control program 215 that is provided in the storage apparatus 13 in the second embodiment.

In FIG. 5, step S41 through step S45 are provided between N branch of judgment step S15 and step S20, which is different from FIG. 4.

In step S41, the CPU 134 checks whether or not there is an available unused L2 entry 320. If there is an available one, the process returns to step S20, and thereafter processing is common to FIG. 4. When there is no available one in this L2 entry (N branch of judgment step S41), the CPU 134 chooses another suitable and available L2 entry 320, and marks out consecutively all the bits 321 therein by using the same value of 1 (state where a difference is accumulated). Thereby, another available L2 entry 320 is released and is used for allocation of the L2 entry 320 in step S20.

More specifically, the CPU 134 chooses another suitable L2 entry 320 (step S42), and sets 1 to the corresponding representative bit 313 (step S43). Subsequently, the CPU 134 sets the corresponding L2 validity bit 312 into invalid (step S44), releases the other L2 entry 320 (step S45), and returns to step S20. Processing thereafter is common to the processing of FIG. 4. The other L2 entry 320 chosen in step S42 is another L2 entry 320 different from this L2 entry 320 that is checked in step S41.

Although the processing in step S43 is equivalent to marking out consecutively the bits 321 of the other L2 entry 320 by using the same value of 1, this means that the difference (not written actually) is accumulated in the corresponding logical volume 131, and thereby there is a possibility that extra copy processing becomes necessary. However, the depletion of the L2 entry 320 can be prevented in return for that. More specifically, since the other L2 entry is released by the step S45 immediately before even when this L2 entry 320 is depleted, the CPU 134 can allocate the L2 entry 320 without fail in step 20.

Figure 6:
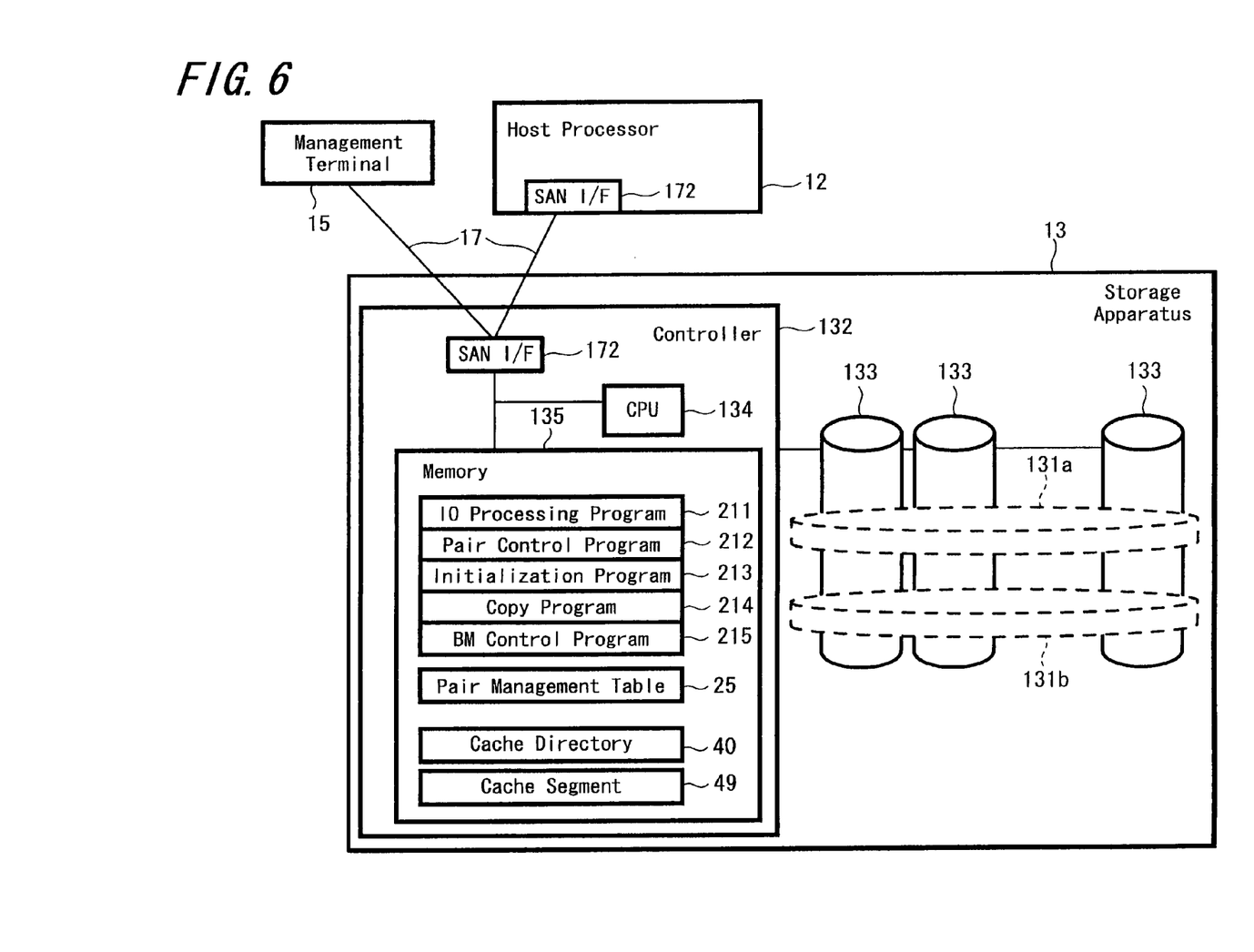
FIG. 6 is a diagram showing a general configuration of another storage apparatus.
Figure 7:
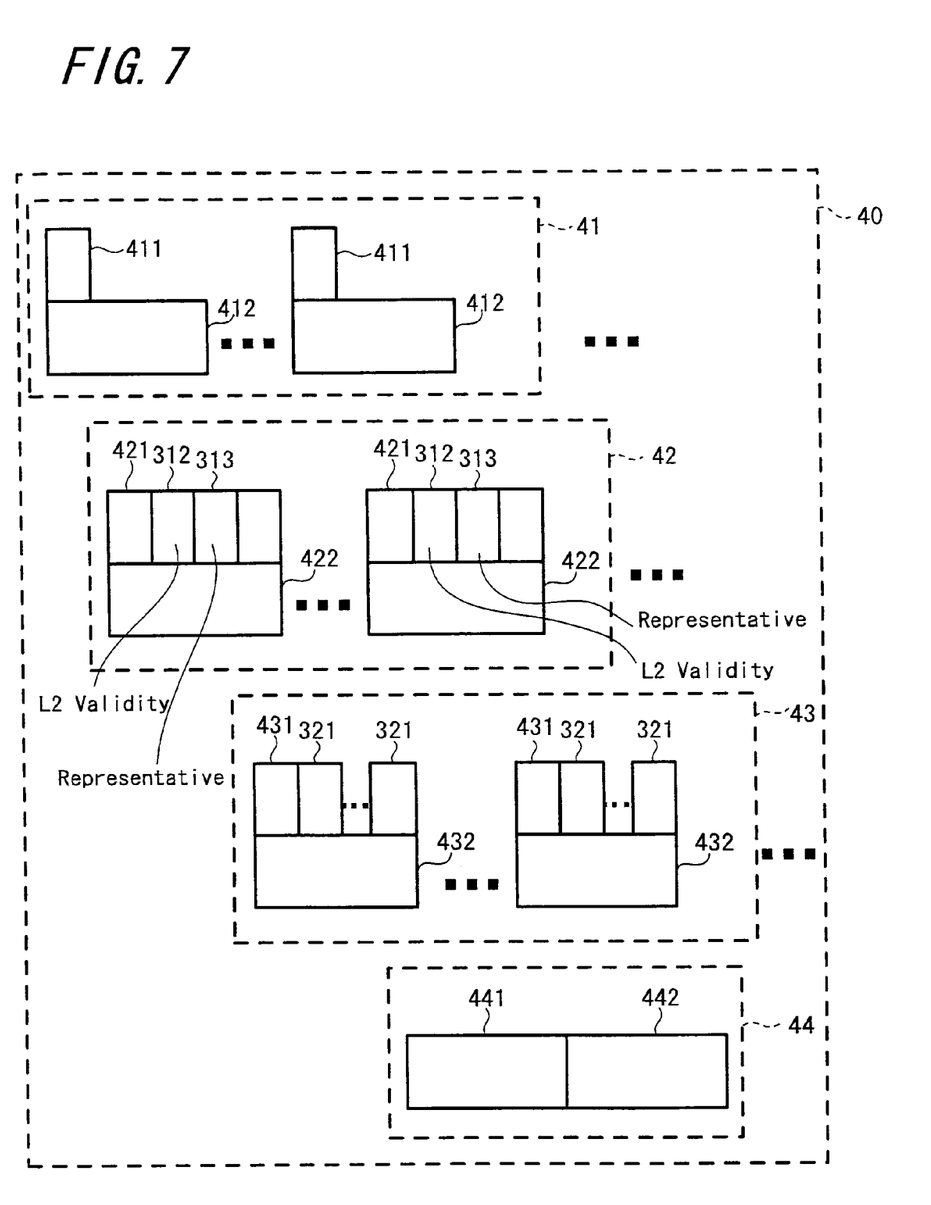
FIG. 7 is a configuration diagram of a cache directory.
Figure 8:
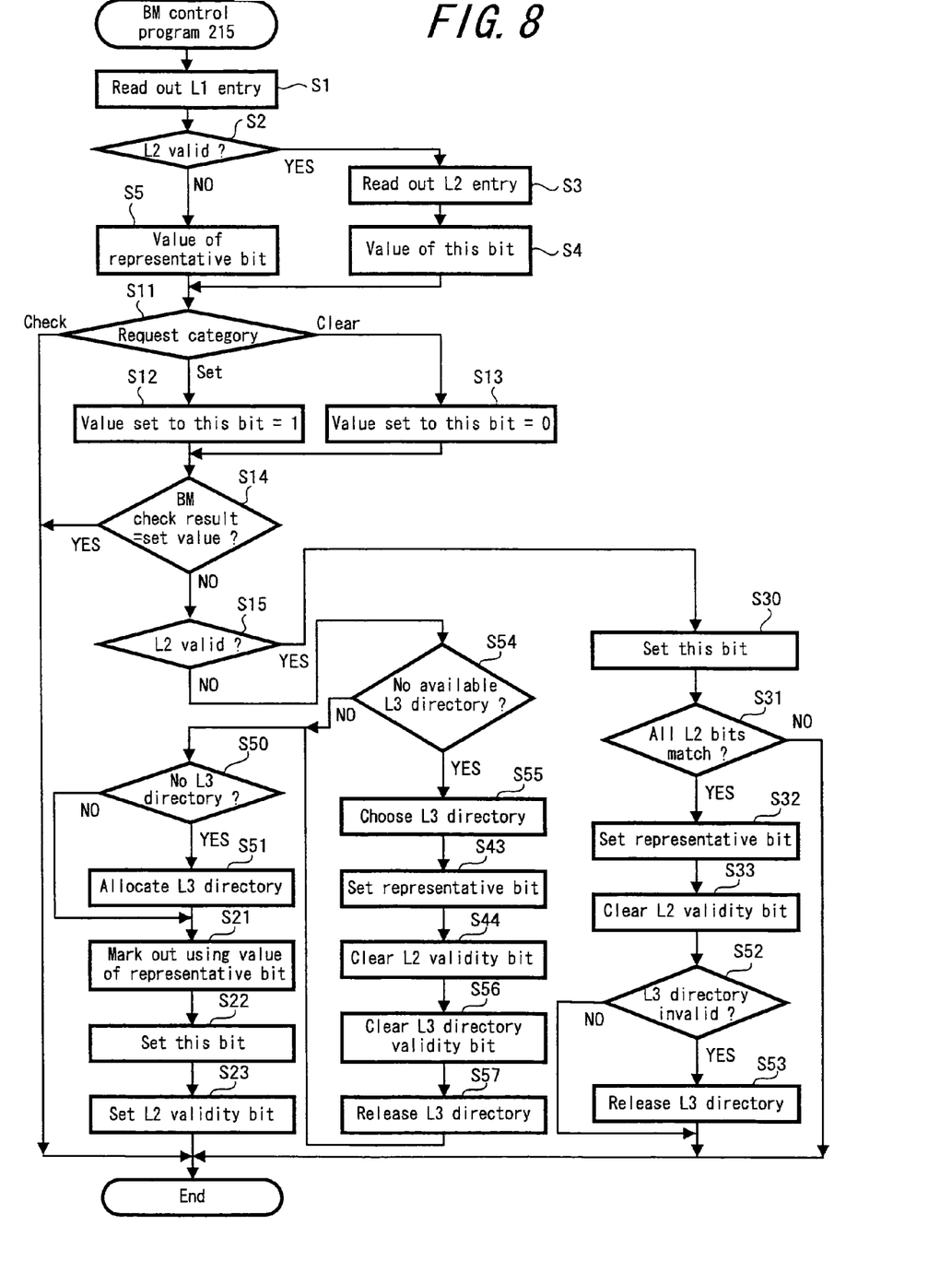
FIG. 8 is a flow chart showing processing of another difference bit map control program.

Next, a third embodiment of the present invention is explained by using FIG. 6 through FIG. 8.

FIG. 6 is a diagram showing a general configuration of the storage apparatus 13 of the third embodiment.

In FIG. 6, this storage apparatus 13 contains a cache segment 49 and a cache directory 40 in the memory 135, which is different from FIG. 1. In addition, this storage apparatus does not have the difference bit map 27 (refer to FIG. 1) in the memory 135. The contents of the difference bit map 27 shown in FIG. 1 are stored in the cache directory 40. The cache segment 49 is a buffer to hold the data on the logical volume 131 in order to be prepared for reading and writing from the host processor 12, and is an assembly of small areas called a segment. Each segment holds independently the data on the logical volume 131. The cache directory 40 is a structure to control the cache segment 49. The IO processing program 211 contains processing of retrieving this cache directory and judging whether or not data of an input and output destination requested by the host processor 12 exists in the cache segment. A configuration of the cache directory 40 is explained in details hereinafter.

FIG. 7 is a configuration diagram of the cache directory 40 that is provided in the storage apparatus 13.

The cache directory 40 is configured to have four tiers made of an L1 directory 41, an L2 directory 42, an L3 directory 43, and a segment management block 44. The L1 directory 41 is made into a structure that a plurality of pairs composed of a validity bit 411 and a pointer 412 is disposed in a row. The pointer 412 stores an address of the L2 directory 42, and the validity bit 411 shows whether the pointer 412 is valid or invalid.

The L2 directory 42 is made into a structure that a plurality of groups composed of a pointer 422, a validity bit 421, an L2 validity bit 312, and a representative bit 313 is disposed in a row. The pointer 422 shows an address of the L3 directory 43. Functions of the validity bit 412 and L2 validity bit 312 are explained later.

The L3 directory 43 is made into a structure that a plurality of groups composed of a string of bits 321, a validity bit 431, and a pointer 432 is disposed in a row.

The validity bit 421 shows that the pointer 432 is also valid when the validity bit and a validity bit of the L3 directory 43 designated by the pointer 422 are 1. The L2 validity bit 312 shows that the string of bits 321 is valid.

Here, the pointer 422 is valid when either the validity bit 421 or the L2 validity bit 312 is 1.

In addition, the pointer 432 stores an address of the segment management block 44, and the validity bit 431 shows whether the pointer 432 is valid or invalid.

The segment management block 44 contains a control flag 441 and a pointer 442. The pointer 442 stores an address of the cache segment 49, and the control flag 441 contains a bit that shows whether the pointer 442 is valid or invalid and a state of the cache segment 49, at least whether or not data is stored.

In the third embodiment of the present invention, when the bit 321 is checked, even the reference of the L3 directory 43 becomes possible at the same time. Meanwhile, when the bit 321 shows an existence of data which should be transferred from the secondary volume 131*b*, for example, it is necessary to perform simultaneously both the reference to the difference bit 321 and the reference to the directory 40. In the third embodiment of the present invention, the number of memory access can be reduced in such case, which contributes to an increase in speed of IO processing.

FIG. 8 is a flow chart showing contents of processing of the difference bit map control program 215 that is provided in the storage apparatus 13 in the third embodiment.

In FIG. 8, step S50 and step S51 are provided instead of step S20, step S52 and step S53 are provided instead of step S34, step S54 and step S55 are provided instead of step S41 and step S42, and step S56 and step S57 are provided instead of step S45, which is different from FIG. 5.

In step S50, the CPU 134 confirms whether the L3 directory exists, and allocates the L3 directory (step S51) only when the L3 directory does not exist (Y branch of judgment step S50). This is because there is a possibility that the L3 directory itself is already allocated for the segment management block 44 connected before and the allocation is not necessary in that case.

In step S52, the CPU 134 checks whether the validity bit 421 is invalid or not, and the L3 directory 43 is released (step S53) only when the validity bit 421 is invalid (Y branch of judgment step S52).

In step S54, the CPU 134 checks whether there is available L3 directory, and releases the L3 directory 43 (step S55) only when there is no available L3 directory (Y branch of judgment step S54). The L3 directory 43 which can be discarded is the L3 directory 43 to which the corresponding segment 49 does not exist or the L3 directory which corresponds only to the segment 49 storing data that can be discarded (so-called clean data to which the same data exists on the disk device 133) even if the corresponding segment 49 exists.

In step S56, the CPU 134 clears the validity bit 421, and furthermore releases the L3 directory 43 (step S57). Processing other than those described hereinabove is common to the second embodiment of the present invention.

Figure 9:
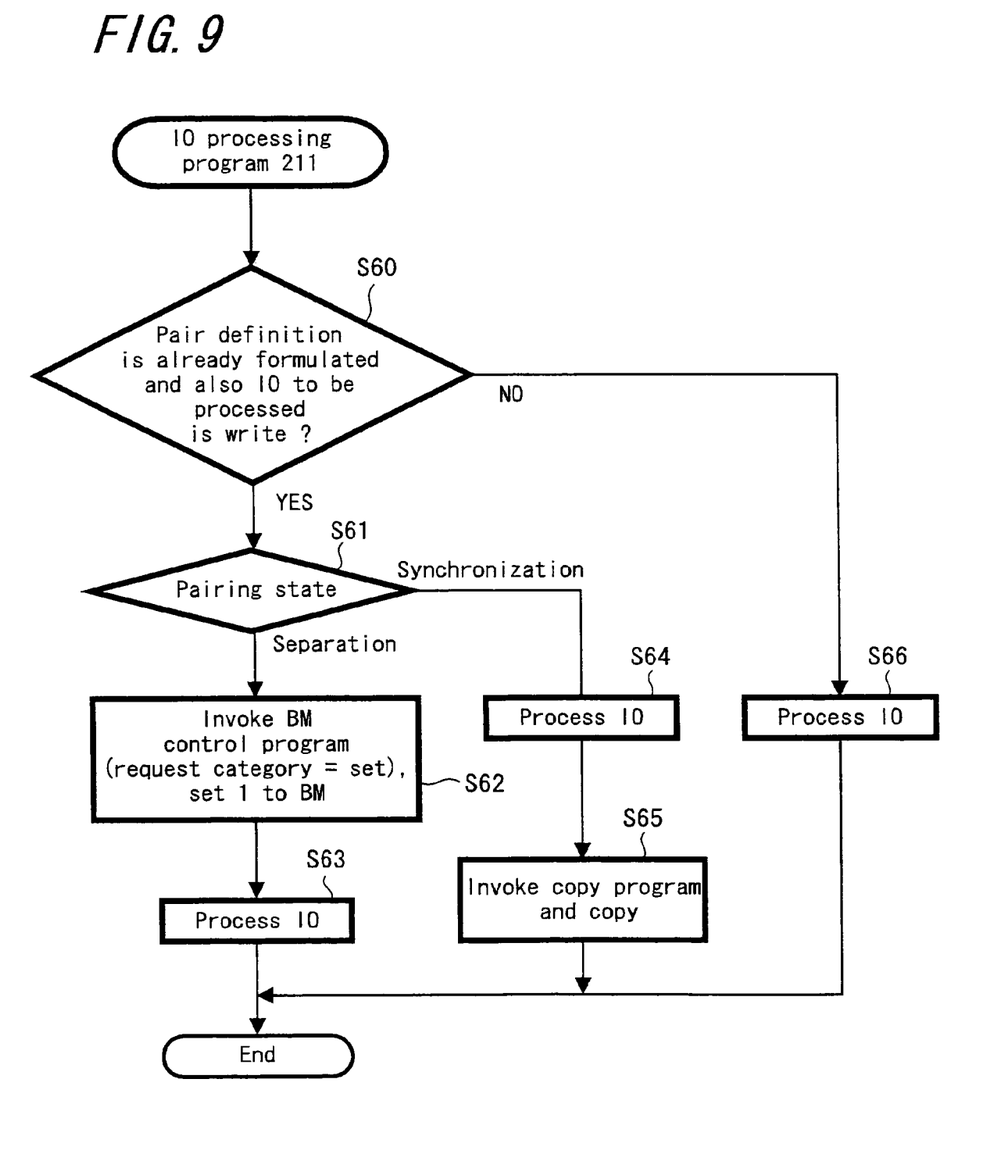
FIG. 9 is a flow chart showing processing of an IO processing program.
Figure 10:
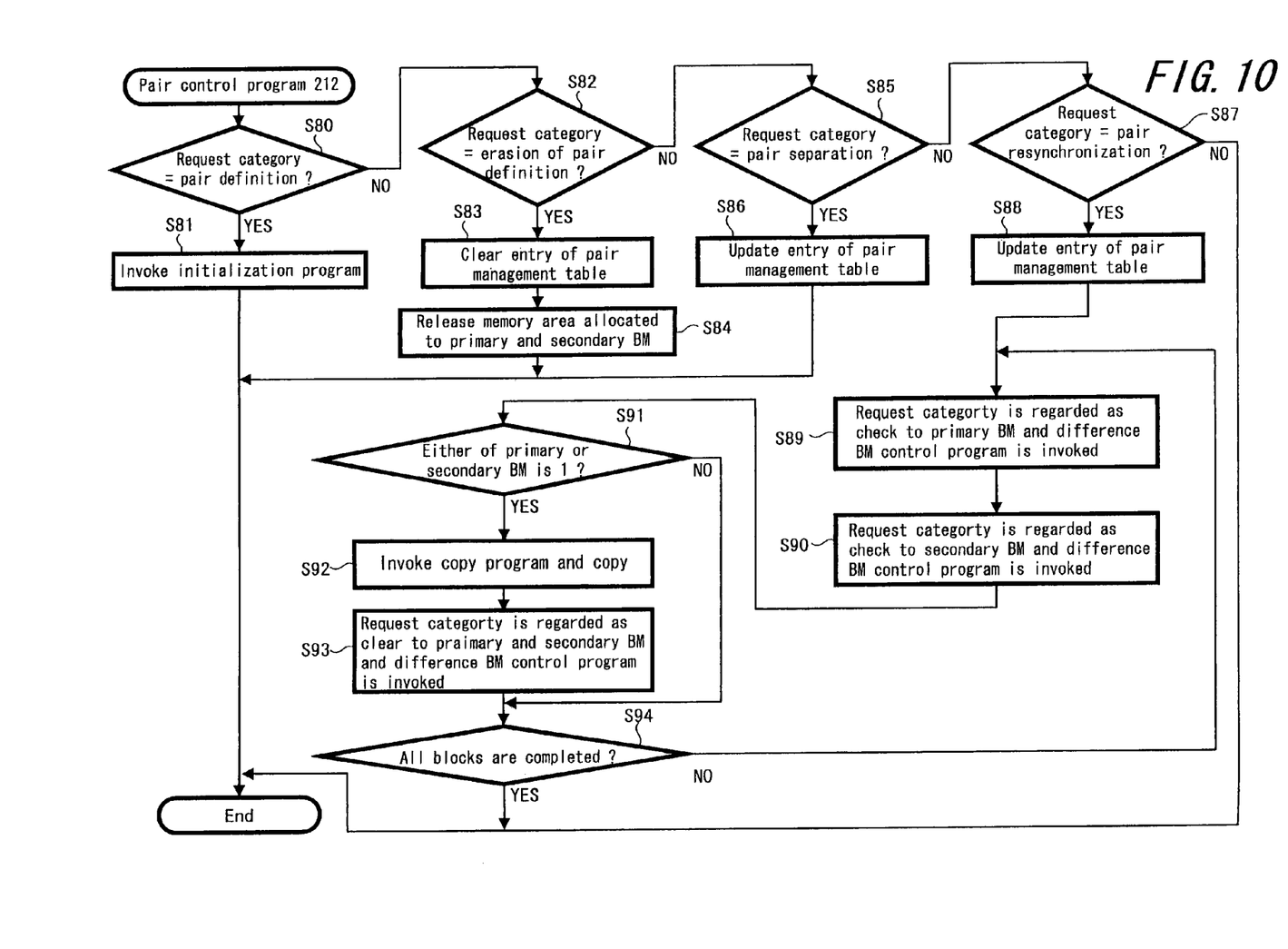
FIG. 10 is a flow chart showing processing of a pair control program.
Figure 11:
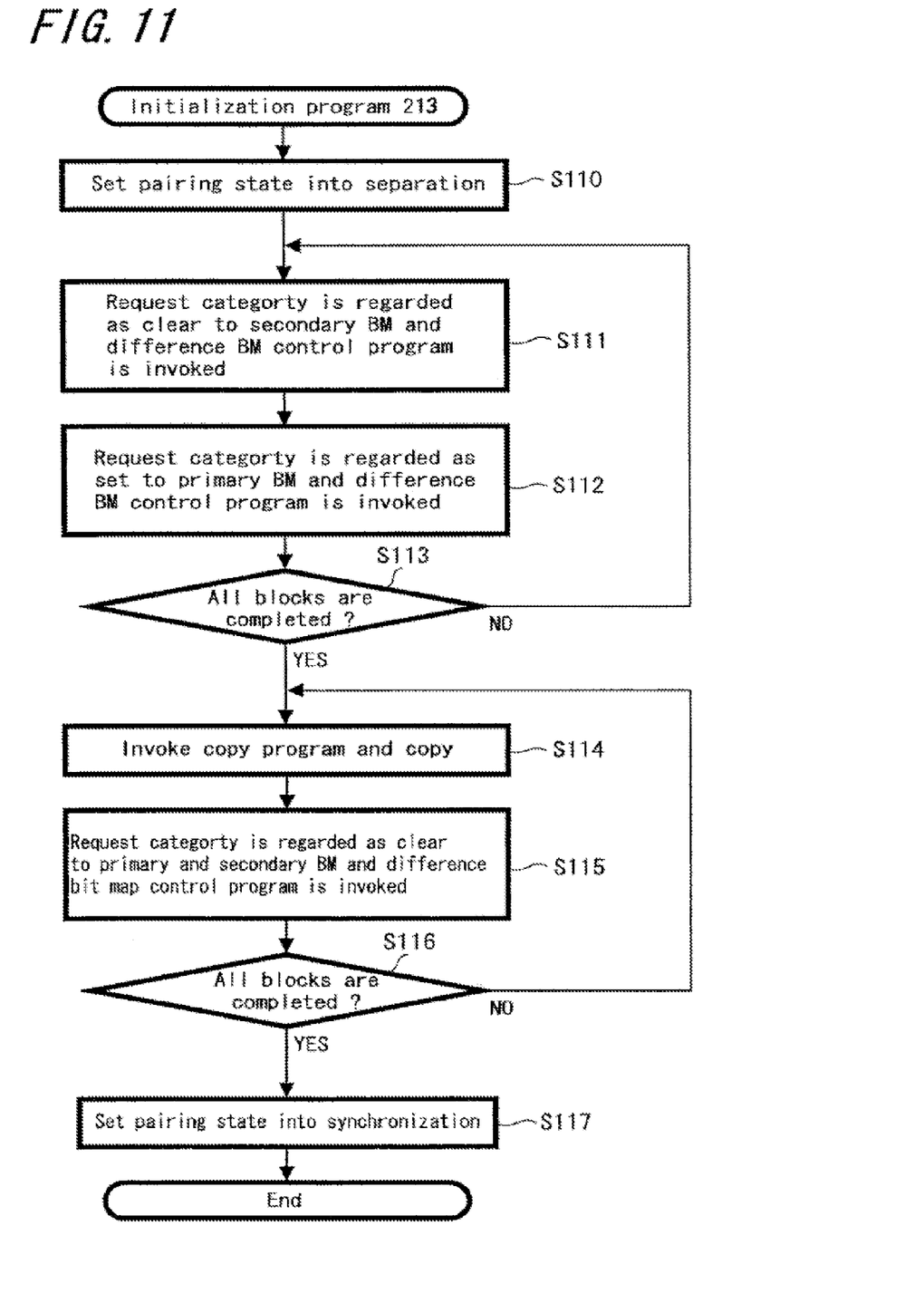
FIG. 11 is a flow chart showing processing of an initialization program.

Next, an explanation is made to flow charts of FIG. 9 through FIG. 11 which become an invoker of the difference bit map control program 215 shown in FIG. 4, FIG. 5 and FIG. 8. The flow charts of FIG. 9 through FIG. 11 are ones which contains processing that becomes a trigger to generate a necessity of rewriting to the contents of the difference bit map 27.

FIG. 9 is a flow chart showing processing of the IO processing program 211.

FIG. 9 shows the processing that is executed by the IO processing program 211 of the storage apparatus 13 when there is an IO request such as a write request and read request of data from the host processor 12 to the storage apparatus 13.

In FIG. 9, it is judged whether or not a pair definition is already formulated between a volume containing a bit that is an object of the IO processing and another volume and also the IO to be processed is the write (step S60). More precisely, the IO processing program 211 judges the pair definition by checking the entry 250 that corresponds to a block on the volume containing the bit of the IO processing object in the pair management table 25 shown in FIG. 2, and also judges whether the IO is the write by a command.

When it is judged in judgment step S60 that the pair definition is already formulated and also the IO to be processed is the write, it is judged whether or not the pairing state is a separation or synchronization (step S61). More precisely, the IO processing program 211 judges whether the volume containing the bit of the IO processing object is either in the state of separation or synchronization based on the pairing state 253 of the pair management table 25 shown in FIG. 2.

Here, in the state of the separation, following processing of invoking the difference bit map control program 215 is executed.

When the pairing state is the separation in judgment step S61, the difference bit map control program 215 is invoked, the request category is regarded as "set", and 1 is set to a bit of the bit map corresponding to the IO (step S62). More precisely, when the pairing state 253 is the separation, the IO processing program 211 regards the request category as "set" and invokes the difference bit map control program 215 since the writing from the host processor 12 into the volume of the primary side containing the bit of the IO processing object is made to be the difference to the logical volume of the secondary side and a position of an updated block (group) is stored on the difference bit map 27 designated by the primary BM address 254, and the difference bit map control program 215 performs the processing of setting 1 to the bit of the bit map corresponding to the IO.

Further, the IO processing program 211 performs processing of the write of the IO by a command (step S63).

In addition, when the pairing state is the synchronization in judgment step S61, the IO processing program 211 performs the IO processing (step S64), and thereafter invokes the copy program 214 to execute a copy (step S65). More precisely, when the pairing state 253 is the synchronization, the writing from the host processor 12 into the volume of the primary side containing the bit of the IO processing object is reflected to the logical volume of the secondary side.

Moreover, when it is judged in judgment step S60 that the pair definition is already formulated and also the IO to be processed is not the write, the IO processing program 211 performs only the IO processing (step S66).

FIG. 10 is a flow chart showing processing of the pair control program 212.

FIG. 10 shows the processing executed by the pair control program 212 of the storage apparatus 13 when there is a pair control request of pair definition, erasion of pair definition, pair separation, and pair resynchronization from the management terminal 15 to the storage apparatus 13.

In FIG. 10, first it is judged whether or not a request category to a block on a volume of a control object is a pair definition (step S80). More precisely, the pair control program 212 judges the pair definition based on a command of the pair control request from the management terminal 15. When the request category is the pair definition in judgment step S80, an invocation of an initialization program is executed (step S81). More precisely, by using the initialization program 213, the pair control program 212 brings into an initialized state that is a state where there is no difference between the primary side bit map corresponding to the volume of the primary side and the secondary side bit map corresponding to the volume of the secondary side and also where the volume of the primary side and the volume of the secondary side are in a pairing state. The initialization program 213 is explained in FIG. 11 that is described later.

When the request category is not the pair definition in judgment step S80, it is judged whether or not the request category to the block on the volume of the control object is the erasion of pair definition (step S82). More precisely, the pair control program 212 judges the erasion of pair definition based on the command of the pair control request from the management terminal 15. When the request category is the erasion of pair definition in judgment step S82, a clearance of the entry of the pair management table is executed (step S83). More precisely, the pair control program 212 erases the entry 250 that corresponds to the block on the volume of the control object in the pair management table 25 shown in FIG. 2.

Furthermore, the memory areas allocated to the primary and secondary bit maps are released (step S84). More precisely, the pair control program 212 releases the memory areas of the different bit map 27 shown in FIG. 3 which have been allocated on the primary side and secondary side.

When the request category is not the erasion of pair definition in judgment step S82, it is judged whether or not the request category to the block on the volume of the control object is the pair separation (step S85). More precisely, the pair control program 212 judges the pair separation based on the command of the pair control request from the management terminal 15.

When the request category is the pair separation in judgment step S85, an update of the entry of the pair management table is executed (step S86). More precisely, the pairing state 253 of the entry 250 corresponding to the block on the volume of the control object in the pair management table 25 shown in FIG. 2 is made into the state of the separation by the pair control program 212.

When the request category is not the pair separation in judgment step S85, it is judged whether or not the request category to the block on the volume of the control object is the pair resynchronization (step S87). More precisely, the pair control program 212 judges the pair resynchronization based on the command of the pair control request from the management terminal 15.

When the request category is the pair resynchronization in judgment step S87, an update of the entry of the pair management table is executed (step S88). More precisely, the pairing state 253 of the entry 250 corresponding to the block on the volume of the control object in the pair management table 25 shown in FIG. 2 is made into the state of the resynchronization by the pair control program 212.

Here, in the state of the resynchronization, following processing of invoking the difference bit map control program 215 is executed.

First, the request category is regarded as "check" to the primary bit map, and an invocation of the difference bit map control program 215 is executed (step S89). More precisely, the pair control program 212 invokes the difference bit map control program 215, and the difference bit map control program 215 performs checking to the primary side bit map corresponding to the volume of the primary side that becomes the pairing state to correspond to the block on the volume of the control object by the resynchronization.

Next, the request category is regarded as "check" to the secondary bit map, and the invocation of the difference bit map control program 215 is executed (step S90). More precisely, the pair control program 212 invokes the difference bit map control program 215, and the difference bit map control program 215 performs checking to the secondary side bit map corresponding to the volume of the secondary side that becomes the pairing state to correspond to the block on the volume of the control object by the resynchronization.

It is judged whether or not either of the primary side bit map or the secondary side bit map is 1 (step S91). More precisely, the pair control program 212 detects a block whose bit of either the primary side bit map or the secondary side bit map is 1 according to a result of the checking.

When either of the primary side bit map or the secondary side bit map is 1 in judgment step S91, the copy program 214 is invoked to execute a copy (step S92). More precisely, the pair control program 212 invokes the copy program 214, and the copy program 214 executes the copy from the volume of the primary side to the volume of the secondary side for the block whose bit of either the primary side bit map or the secondary side bit map is 1 according to the result of the checking. In this case, a restoration from the volume of the secondary side to the volume of the primary side is not executed.

Further, the request category is regarded as "clear" to the primary side bit map and secondary side bit map, and the invocation of the difference bit map control program 215 is executed (step S93). More precisely, the pair control program 212 invokes the difference bit map control program 215, and the bit is made into 0 for the block whose bit of either the primary side bit map or the secondary side bit map is 1 since the difference between the primary side bit map and the secondary side bit map is cancelled by the copy.

The processing and judgment from step S89 to step S93 are repeated to all blocks on the volume of the control object (step S 94). Here, when either of the primary bit map or the secondary bit map is not 1 in judgment step S91, the judgment is made in step S94 to another block which is not processed yet.

FIG. 11 is a flow chart showing processing of the initialization program 213.

FIG. 11 shows processing to bring into an initialized state that is a state where there is no difference between the primary side bit map corresponding to the volume of the primary side and the secondary side bit map corresponding to the volume of the secondary side and also where the volume of the primary side and the volume of the secondary side are in a pairing state, which is executed by the initialization program 213 of the storage apparatus 13 when there is the pair control request of the pair definition from the management terminal 15 to the storage apparatus 13.

First, the pairing state is set into the separation (step S110). More precisely, the pairing state 253 of the entry 250 corresponding to the block on the volume of the control object in the pair management table 25 shown in FIG. 2 is made into the state of the separation by the initialization program 213.

Here, in the state of the separation, following processing of invoking the difference bit map control program 215 is executed.

The request category is regarded as "clear" to the secondary side bit map, and the invocation of the difference bit map control program 215 is executed (step S111). More precisely, the initialization program 213 invokes the difference bit map control program 215, and the bit is made into 0 for the block whose bit of the secondary side bit map is 1 in order to cancel the difference between the primary side bit map and the secondary side bit map.

Further, the request category is regarded as "set" to the primary side bit map, and the invocation of the difference bit map control program 215 is executed (step S112). More precisely, the initialization program 213 invokes the difference bit map control program 215, and the bit is made into 1 for the block whose bit of the primary side bit map is 0 in order to store the difference on the primary side bit map even if there is IO processing during initialization.

The processing of step S111 through step S112 is repeated to all blocks on the volume of the control object (step S113).

When it is judged in judgment step S113 that the processing is completed to all the blocks, the copy program 214 is invoked to execute a copy (step 114). More precisely, the initialization program 213 invokes the copy program 214, and the copy program 214 executes the copy from the volume of the primary side to the volume of the secondary side for the block whose bit of the primary side bit map is 1 according to a result of the setting. In this case, the restoration from the volume of the secondary side to the volume of the primary side is not executed.

Further, the request category is regarded as "clear" to the primary side bit map and the secondary side bit map, and the invocation of the difference bit map control program 215 is executed (step S115). More precisely, the initialization program 213 invokes the difference bit map control program 215, and the bit is made into 0 for the block whose bit of either the primary side bit map or the secondary side bit map is 1 since the difference between the primary side bit map and the secondary side bit map is cancelled by the copy.

The processing from step S114 to step S115 is repeated to all the blocks on the volume of the control object (step S116).

Then, the pairing state is set into the synchronization (step S117). More precisely, the pairing state 253 of the entry 250 corresponding to the block on the volume of the control object in the pair management table 25 shown in FIG. 2 is made into the state of the synchronization by the initialization program 213.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A difference bit map management method for managing a difference of a volume corresponding to a logical volume in a storage apparatus by using a difference bit map to record a difference, which manages renewal with respect to data stored in a logical volume at a certain time point, wherein
said difference bit map is expressed by a combination of two-tier tables having an entry of a first tier table and an entry of a second tier table, the entry of said second tier table having a plurality of first bits stored therein;
setting a value of one of the first bits to express a presence or absence of the difference shown by the entry of said first tier table;
storing in the entry of said first tier table first identification information that specifies the entry of said second tier table and second identification information that indicates an existence or non-existence of the entry of said second tier table; and
recording the non-existence of the entry of the second tier table in the second identification information stored on the corresponding entry of the first tier table when all the first bits of the entry of said second tier table are equal to a predetermined value.

2. A difference bit map management method according to claim 1, wherein processing for management of said difference bit map is executed by a bit map control program in said storage apparatus.

3. A difference bit map management method according to claim 1, wherein said first bits include two or more consecutive bits having the same value.

4. A difference bit map management method according to claim 1, wherein said first identification information is two-tier address bits showing an address of the entry of said second tier table.

5. A difference bit map management method according to claim 1, wherein said second identification information is two-tier validity bits for judging whether the bit stored on the entry of said second tier table is regarded as valid so that all of this bit is used or the bit stored on the entry of said second tier table is regarded as invalid so that the consecutive same value is used.

6. A difference bit map management method according to claim 1, wherein a third bit is stored on the entry of said first tier table, and when all the first bits of the entry of said second tier table are equal to a value of the third bit, the non-existence of the entry of said second tier table is recorded in the second identification information that is stored on the corresponding entry of the first tier table.

7. A difference bit map management method according to claim 6, wherein said third bit is a representative bit in which the consecutive same value stored on the entry of said second tier table is stored as a representative on the entry of said first tier table.

8. A difference bit map management method according to claim 6, wherein a predetermined value is stored on the third bit in order to record the non-existence of the second tier table in the second identification information that is stored on the corresponding entry of the first tier table when the entry of said second tier table is released.

9. A difference bit map management method according to claim 1, wherein said entry of the first tier and said entry of the second tier are stored on a directory to manage a cache memory that is used for IO processing in said storage apparatus.

10. A storage apparatus which has a difference bit map for recording a difference, which manages renewal with respect to data stored in a logical volume at a certain time point and for managing a difference of a logical volume, wherein the storage apparatus has:
a first tier storing portion for storing a first tier table of said difference bit map;
a second tier storing portion for storing a second tier table of said difference bit map;
a first bit storing portion for storing a plurality of first bits, each indicating a presence or absence of a difference in an entry of said second tier table;
a first and second identification information storing portion for storing first identification information that specifies the entry of said second tier table in an entry of said first tier table and second identification information that indicates an existence or non-existence of said second tier table; and
a second identification information update portion for recording the non-existence of the entry of said second tier table in the second identification information which is stored on the corresponding entry of said first tier table when all the first bits of the entry of said second tier table are equal to a predetermined value.

11. A storage apparatus according to claim 10, wherein a bit map control program executes each function of said first tier storing portion, said second tier storing portion, said first bit storing portion, said first and second identification information storing portion, and said second identification update portion, which manage said difference bit map.

12. A storage apparatus according to claim 10, wherein said first bits include two or more consecutive bits having the same value.

13. A storage apparatus according to claim 10, wherein said first identification information is two-tier address bits showing the entry of said second tier table.

14. A storage apparatus according to claim 10, wherein said second identification information is two-tier validity bits for judging whether the bit stored on the entry of said second tier table is regarded as valid so that all of this bit is used or the bit stored on the entry of said second tier table is regarded as invalid so that the consecutive same value is used.

15. A storage apparatus according to claim 10, wherein the storage apparatus has a third bit storing portion for storing a third bit on the entry of said first tier table, and a second identification information update portion for recording the non-existence of the entry of said second tier table in the second identification information that is stored on the corresponding entry of said first tier table when all the first bits of the entry of said second tier table are equal to a value of the third bit.

16. A storage apparatus according to claim 15, wherein said third bit is a representative bit in which the consecutive same value stored on the entry of said second tier table is stored as a representative on the entry of said first tier table.

17. A storage apparatus according to claim 10, wherein said entry of the first tier and said entry of the second tier are stored on a directory to manage a cache memory that is used for IO processing.

18. An information processing system comprising a storage apparatus which uses a difference bit map for recording a difference, which manages renewal with respect to data stored in a logical volume at a certain time point and for managing a difference of a logical volume in order to perform IO processing to the logical volume of a storage apparatus based on an IO command from a host computer, wherein said storage apparatus has:
a first tier storing portion for storing a first tier table of said difference bit map;

a second tier storing portion for storing a second tier table of said difference bit map;

a first bit storing portion for storing a plurality of first bits, each indicating a presence or absence of a difference in an entry of said second tier table;

a first and second identification information storing portion for storing first identification information that specifies the entry of the second tier table in an entry of said first tier table and second identification information that indicates an existence or non-existence of said second tier table; and a second identification information update portion for recording the non-existence of the entry of said second tier table in the second identification information which is stored on the corresponding entry of said first tier table when all the first bits of the entry of said second tier table are equal to a predetermined value.

19. An information processing system according to claim 18, wherein said first identification information is two-tier address bits showing an address of the entry of said second tier table.

20. An information processing system according to claim 18, wherein said second identification information is two-tier validity bits for judging whether a bit stored on the entry of said second tier table is regarded as valid so that all of this bit is used or a bit stored on the entry of said second tier table is regarded as invalid so that the consecutive same value is used.

* * * * *